Sept. 26, 1961 TATSUYA TAKAGI 3,001,610
OIL DAMPER
Filed March 23, 1959 2 Sheets-Sheet 1

INVENTOR.
TATSUYA TAKAGI

Sept. 26, 1961 TATSUYA TAKAGI 3,001,610
OIL DAMPER
Filed March 23, 1959 2 Sheets-Sheet 2

INVENTOR.
TATSUYA TAKAGI
BY 3,001,610
OIL DAMPER
Tatsuya Takagi, 63 Araebisu-machi,
Nishinomiya-shi, Japan
Filed Mar. 23, 1959, Ser. No. 801,079
3 Claims. (Cl. 188—88)

This invention relates to an oil damper attachable to the frame and chassis spring of a vehicle, comprising cylinders filled with oil, a main piston, an auxiliary piston co-operating with the main piston and a spring for raising the auxiliary piston.

The first object of this invention is to obtain an oil damper effective for the natural vibration of a vehicle and which renders powerless the external vibrative forces of higher frequency due to rough roads.

Only when the main piston and the auxiliary piston are in contact, oil holes of the main piston are closed and the rising speed of the auxiliary piston due to a pressure spring is limited to a suitable value so as to damp the natural vibration of the vehicle to a relatively low frequency, such as in a passenger car, and to overcome vibrative external forces of higher frequency.

The second object of the invention is to provide an oil damper which improves the contact of wheels with the road by making the motion of the main piston free both on extension and compression of the damper, thus by making the damping force of the damper effective when the wheel suddenly runs into a dent of the road.

The third object of the invention is to obtain an increased damping force in proportion to the degree of compression of the chassis spring of a vehicle.

The object is so attained that the rise of the auxiliary piston is limited at the neutral position.

The neutral position mentioned above is understood as a position near the lower bottom face of the main piston when the static load of the vehicle and the bearing force of the chassis spring are in a balanced state.

According to characteristic features of the invention, disadvantages due to dampers of the prior art are completely eliminated and by use of the damper of the invention, the displacement of the vehicle during high speed operation is strongly damped, in response to sudden roughness of the road and the contact of the wheels with road is improved.

With these and other objects in view, the invention consists in certain novel features of construction of parts as will be more fully hereinafter described and pointed out in the claims.

Figure 1:
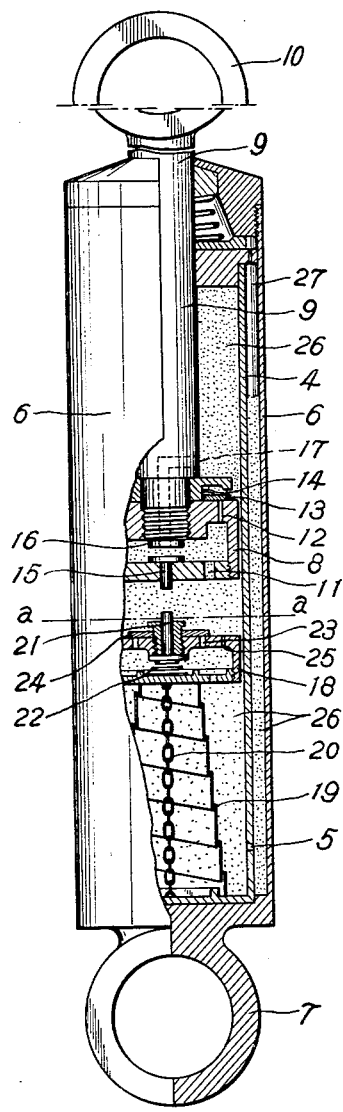

In the accompanying drawings:

FIG. 1 is a view in vertical and partial section of one of the oil dampers of this invention.

Figure 2:
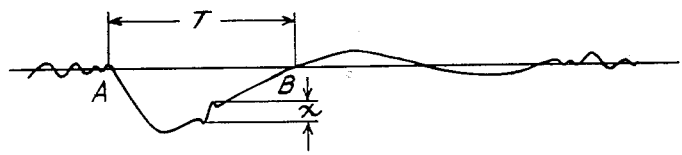

FIG. 2 an explanatory drawing of piston movement.

Figure 3:
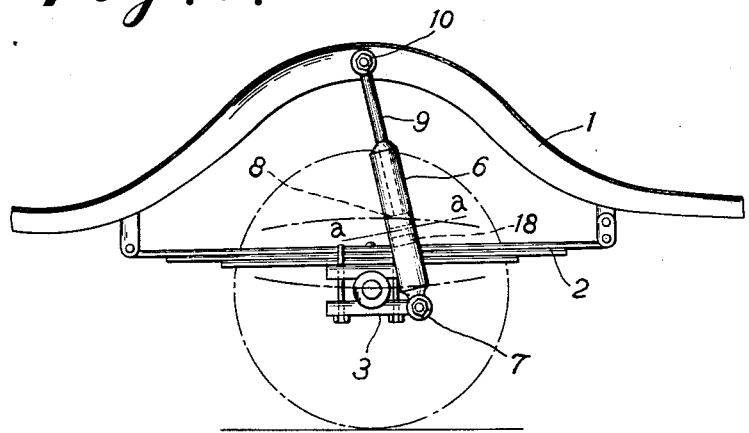
Figure 4:
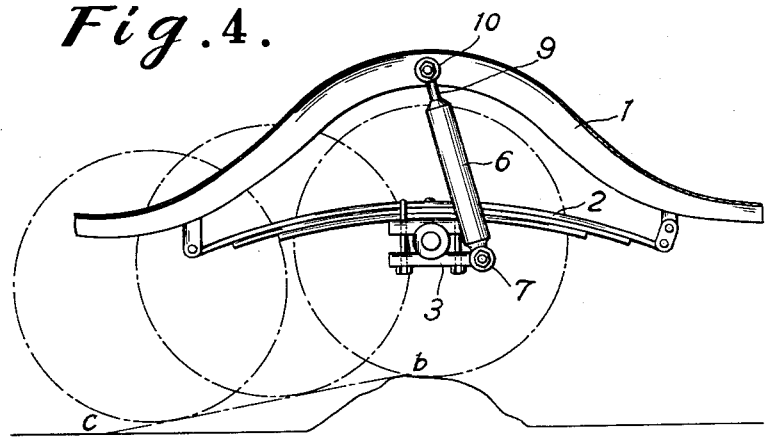

FIG. 3 and FIG. 4 are side views of main parts of a vehicle frame provided with the oil damper of the invention.

In the drawings; 1 is a vehicle frame; 2 is a chassis spring; 3 is an axle bearing member; 4 is an inner cylinder; 5 is an oil hole bored in the lower wall of the cylinder 4; 6 is an outer cylinder fixed to the cylinder 4 with a certain clearance with the latter; 7 is an eye piece formed at the lower end of the outer cylinder 6; 8 is a cylindrical main piston which is loosely fitted within the inner cylinder with such a clearance that the piston is movable up and down at a limited speed; 9 is a piston rod fixed at the top center of the main piston and the upper part of the rod penetrates the cap of the cylinder 4 to form an eye piece 10.

11 is a large hole bored in a part of the bottom plate of the main piston 8; 12 is a valve port bored in a part of the top plate of the main piston 8; 13 is a one way valve permitting the oil to flow upward only; 14 is a pressure spring; 15 is a lifting valve movably fitted at the center of the bottom plate of the main piston 8; 16 is a valve seat having an opening at the lower end of the piston rod 9 and having an opening at the lower part of valve port 17 at the center of the valve seat and the upper part of the valve port opens within the inner cylinder 4 at the upper face of the main piston 8.

18 is a cylindrical auxiliary piston fitted with a small clearance within the inner cylinder 4 below the main piston 8, 19 is a helical pressure spring for lifting the auxiliary piston and inserted between the lower face of the auxiliary piston and the bottom face of the inner cylinder 4, 20 is a chain which limits the lift of the auxiliary piston 18 and prevents it from passing beyond neutral position a, 21 is a pin loosely fitted to move up and down at the center of the top plate of the auxiliary piston 18 and a small pressure spring 22 is inserted between the lower end of the pin and the bottom plate of the auxiliary piston 18, 23 is a valve port bored in a part of the top plate of the auxiliary piston, 24 is a one way valve, permitting the oil to flow upward only, mounted on the upper part of the valve, and a small oil hole 25 is bored in a part of the top plate of the auxiliary piston 18 near the valve. (This oil hole 25 is provided so as to limit the rising speed of the auxiliary piston to the special speed which is part of this invention.)

26 is oil, filled within the inner cylinder 4 and in the clearance between the inner cylinder and the outer cylinder 6, and a certain air chamber 27 is reserved at the upper part of the clearance.

The operation of the oil damper of this invention will be explained as follows:

When the vehicle runs on a level road, the main piston 8 will fluctate slightly up and down near the neutral position a, but when the vehicle suddenly runs on a small protrusion of road during high speed running or on a big protrusion during low speed, chassis spring 2 will be compressed and the main piston 8 will pass over the neutral position a and moves downwards within the inner cylinder 4 in contact wtih the auxiliary piston 18, whereby the motion of the piston rod 9 will not be restricted, because either of one way valves 13, 24 of both pistons are opened.

At the next moment, the compressed chassis spring 2 strongly repels the vehicle body, however, when the oil damper is subject to extensive external force, one way valves 13, 24 of both pistons are closed and the lifting valve 15 closes the valve port 17 of the valve seat 16 by the pressure spring 19, so that oil within the upper part of the inner cylinder 4 will shift downwards in a small quantity through the small clearance between the main piston 8 and the inner cylinder 4, thus the extensive external force of the main piston 8 will be damped. The larger the degree of compression of the pressure spring 19, the larger is the force which presses upward the lifting valve 15. By keeping oil pressure in the upper side of the main piston 8 corresponding to said degree of compression, the main piston 8 will exert gradually increasing damping force.

However, when the damping force of the oil damper is too strong, as shown in FIG. 4, immediately after the wheel passed over the protrusion of road, it will jump from point b to c without contacting the road. For this case, if rising speed of the auxiliary piston 18 is designed to become slower than the falling speed of the wheel, in case of sudden falling of the wheel, the auxiliary piston 18 will part from its contact with the main piston 8 and the lifting valve 15 will part from the valve seat 16 to open valve port 17, thus the damper will suddenly be extended and the wheel will freely fall, assuring smooth contact with the road.

In usual vehicles, wheels and their accessories (being the weight below chassis springs) are considerably lighter than the vehicle body (being the weight above chassis springs), so that depression of a wheel due to force of the chassis spring and gravity into a road depression are large compared with relative response of the vehicle body and the wheel due to natural vibration of the vehicle when the weight of the vehicle body and chassis spring force are combined.

According to the invention, the rising speed (maximum speed when amplitude is maximum) of the auxiliary piston 18 becomes slightly larger than the maximum speed of the main piston 8 due to natural vibration of the vehicle (natural vibration of the most high frequency among natural vibrations produced according to the change of static load), thus slow vibration during running over slight unevenness and natural vibration of the vehicle itself will be completely damped. The proper or natural vibration of the vehicle exists when the rate of the vehicle and the force of the chassis spring are combined. And, when the vehicle is subject to vibrative external force of higher frequency than its natural vibration due to sudden roughness of the road, the main piston 8 moves faster than the rising speed of the auxiliary piston 18, so that the main piston 8 will be parted from contact with the auxiliary piston 18. Accordingly, the oil hole 17 will be opened, enabling the main piston 8 to move freely, the oil damper having no damping force on either its extension or compression, thus the wheel will move freely.

When the wheel suddenly falls into a hole in the road during its running, it is required that the wheel will promptly support the fall of the vehicle body by the bearing force of the chassis spring. In this case, since the main piston 8 lies in an extended position from the neutral position $a$ and the lifting valve 15 is down, the valve port 17 being opened, the main piston 8 may move up and down freely and the wheel may freely and promptly go down without being badly damped by the oil damper.

In FIG. 2, there is shown an explanatory drawing of the piston movements, wherein the displacement of piston is shown on the ordinate axis and the time is shown on the abscissa axis. "T" represents ½ wave length of natural vibration of the vehicle, in which other high frequency vibrations of minute amplitude such as $x$ are often included. During damping of natural vibration of the vehicle by contacting both pistons, if these high frequency vibrations take part in suddenly, the main piston and the auxiliary piston will be parted with each other, thus the damping force will be lost.

In this case, as shown in FIG. 1, the pin 21 is fitted loosely for up and down motion relative to the auxiliary piston 18 and provided with small pressure spring 22 thereunder, the damper may still be effective for natural vibration, because the lifting valve 15 is always pressed to the valve seat 16 whenever both pistons are slightly apart due to above mentioned high frequency vibrations of minute amplitude.

Having thus described the invention, what is claimed as new and desired to be secured by Letters Patent is:

1. An oil damper effective for natural vibration damping and attachable to the frame and chassis spring of a vehicle, comprising inner and outer cylinders filled with oil, a main piston, an auxiliary piston cooperating with said main piston, both pistons being slidably fitted in said inner cylinder, a pressure spring inserted between the lower face of said auxiliary piston and the bottom face of said inner cylinder, said main piston and said auxiliary piston being provided with one way valves which respectively permit oil to flow upward only, said main piston having a piston rod at the center of its upper portion, the upper end of said piston rod being extended from the cylinders to be attached to the vehicle frame, said outer cylinder having a cap member screwed in its upper end and a fitting member at its lower end to be attached to the vehicle axle, a valve port bored through the upper and lower faces of said main piston at the center of the bottom end of said piston rod against which a one way valve is fitted, a lift valve provided at the bottom of said main piston to act upwardly against said valve port of said bottom end of said piston rod, said lift valve closing said valve port when its bottom touches said auxiliary piston, a small hole bored through upper and lower faces of said auxiliary piston, wherein the rising speed of said auxiliary piston due to said pressure spring is limited by oil flowing through said small holes to a speed less than the speed of said main piston due to the high speed motions of the wheel upon rough roads, and where said rising speed is made larger than the speed of said main piston when the wheel vibrates in the state of its natural rotation.

2. An oil damper according to claim 1, the stress of said pressure spring adapted to increase gradually in proportion to its degree of compression and means to limit the rising position of said auxiliary piston, the damper generating gradually increased force in response to external force in proportion to its degree of displacement from the neutral position toward the bottom.

3. An oil damper according to claim 1, including a free movable pin loosely fitted to the upper portion of the auxiliary piston, said pin being adapted to push said lifting valve of said main piston, a small pressure spring being provided to press said movable pin upwardly so that the damper still exerts a damping force even when said auxiliary piston has moved away from said main piston.

References Cited in the file of this patent

UNITED STATES PATENTS

| 1,445,615 | Ferres | Feb. 13, 1923 |
| 2,355,491 | Whisler | Aug. 8, 1944 |
| 2,695,778 | Mercier et al. | Nov. 30, 1954 |
| 2,722,288 | Steinbauer | Nov. 1, 1955 |
| 2,886,142 | Orshansky | May 12, 1959 |

FOREIGN PATENTS

| 1,115,926 | France | Jan. 23, 1956 |